United States Patent
Cyr et al.

(10) Patent No.: US 7,920,253 B2
(45) Date of Patent: Apr. 5, 2011

(54) POLARIZATION OPTICAL TIME DOMAIN REFLECTOMETER AND METHOD OF DETERMINING PMD

(75) Inventors: Normand Cyr, Quebec (CA); Hongxin Chen, Quebec (CA)

(73) Assignee: EXFO Inc., Quebec (CA)

( * ) Notice: Subject to any disclaimer, the term of this patent is extended or adjusted under 35 U.S.C. 154(b) by 274 days.

(21) Appl. No.: 11/992,797

(22) PCT Filed: Sep. 29, 2006

(86) PCT No.: PCT/CA2006/001610
§ 371 (c)(1),
(2), (4) Date: Mar. 28, 2008

(87) PCT Pub. No.: WO2007/036051
PCT Pub. Date: Apr. 5, 2007

(65) Prior Publication Data
US 2009/0244522 A1    Oct. 1, 2009

Related U.S. Application Data

(60) Provisional application No. 60/721,532, filed on Sep. 29, 2005.

(51) Int. Cl.
G01N 21/00    (2006.01)
G01J 4/00    (2006.01)
(52) U.S. Cl. ..................... 356/73.1; 356/364; 356/370
(58) Field of Classification Search ............... None
See application file for complete search history.

(56) References Cited

U.S. PATENT DOCUMENTS

| | | | | |
|---|---|---|---|---|
| 6,724,469 | B2 * | 4/2004 | Leblanc | 356/73.1 |
| 6,946,646 | B2 * | 9/2005 | Chen et al. | 250/227.17 |
| 7,126,678 | B2 * | 10/2006 | Fayolle et al. | 356/73.1 |
| 7,164,469 | B1 * | 1/2007 | Chen et al. | 356/73.1 |
| 7,180,582 | B2 * | 2/2007 | Yano et al. | 356/73.1 |
| 7,212,281 | B2 * | 5/2007 | Tanigawa et al. | 356/73.1 |
| 7,373,027 | B2 * | 5/2008 | Wuilpart | 385/11 |

OTHER PUBLICATIONS

"Reflectrometric measurements of polarization properties in optical-fiber links", Galtarossa et al., Journal of Optical Fiber Communications Reports, vol. 1, Issue No. 2, pp. 150-179, Oct. 2004.

"Distributed measurement of strain using optical-fibre backscatter polarimetry", Rogers, Society for Experimental mechanics (SEM)—STRAIN, vol. 36, Issue No. 4, pp. 133-142, Nov. 2000.

(Continued)

*Primary Examiner* — Tarifur Chowdhury
*Assistant Examiner* — Gordon J Stock, Jr.
(74) *Attorney, Agent, or Firm* — Thomas Adams (57) ABSTRACT

In a method of measuring cumulative polarization mode dispersion (PMD) along the length of a fiber-under-test (FUT), a polarization-sensitive optical time domain reflectometer (POTDR) is used to inject into the FUT plural series of light pulses arranged in several groups. Each group comprises at least two series having closely-spaced wavelengths and the same state of polarization (SOP). At least two of such groups are injected and corresponding OTDR traces obtained for each series by averaging the impulse-response signals of the several series in the group. The process is repeated for a number of groups. The PMD is obtained by normalizing the OTDR traces of all of the groups, then computing the difference between each normalized OTDR trace in one group and the corresponding normalized OTDR trace in another group, followed by the mean-square value of the differences. Finally, the PMD is computed as a predetermined function of the mean-square difference.

29 Claims, 1 Drawing Sheet solid line: optical signal
dashed line: electrical signal

OTHER PUBLICATIONS

"Fully-distributed polarization properties of an optical fiber using the backscattering technique" Wulpart et al., Proceedings of SPIE—Applications of Photonic Technology—ICAPT 2000, vol. 4087, 2000, pp. 396-404.

Using polarimetric optical time-domain reflectometry to estimate linear birefringence suppression in spun fibre: Ellison, et al., IEE Proceedings—Optoelectronics, vol. 146, Issue No. 3, pp. 137-141, Jun. 1999.

"Fully polarimetric optical time-domain reflectometer with 1-m spacial resolution", Bebbington et al., Optical Fiber Communication Conference—OFC 1997, pp. 185-186, Feb. 21, 1997.

Birefringence distribution along fiber length, Ozeki et al., Optical Fiber Communications Conference—OFC 1996, pp. 295-297, Mar. 1, 1996.

"Automatic matrix-based analysis method for extraction of optical fiber parameters from polarimetric optical time domain reflectometry data", Ellison et al., Journal of Lightwave Technology, vol. 18, Issue No. 9, pp. 1226-1232, Sep. 2000.

"Spatially resolved PMD measurements", Galtarossa et al., Journal of Lightweight Technology, vol. 22, Issue No. 4, pp. 1103-1115, Apr. 2004.

\* cited by examiner

FIG. 1

POLARIZATION OPTICAL TIME DOMAIN REFLECTOMETER AND METHOD OF DETERMINING PMD

CROSS-REFERENCE TO RELATED DOCUMENTS

This application claims priority from U.S. Provisional patent application No. 60/721,532 filed Sep. 29, 2005, the entire contents of which are incorporated herein by reference.

The present application is related to Disclosure Document No. 564,640 entitled "Robust Accumulated Polarization Mode Dispersion Measurements by Use of a Single End OTDR Technique, filed in the United States Patent and Trademark Office on Nov. 9, 2004. The entire contents of this Disclosure Document are incorporated herein by reference.

TECHNICAL FIELD

The invention relates to a method and apparatus for measuring polarization-dependent characteristics of optical paths and is especially applicable to so-called polarization optical time domain reflectometers, and corresponding methods, for measuring polarization mode dispersion (PMD) of an optical path which comprises mostly optical waveguide, such as an optical fiber link.

BACKGROUND ART

In optical fibers used in optical communications systems, orthogonal polarization modes have different group delays; known as differential group delay (DGD). This causes the polarization mode dispersion (PMD) phenomenon, i.e., a spreading of the pulses propagating along the fibers Where long optical fiber links are involved, overall PMD may be sufficient to cause increased bit error rate, thus limiting the transmission rate or maximum transmission path length. This is particularly problematical at higher bit rates. As a variable or quantity characterizing the said phenomenon, the PMD value of a device is defined as either the mean value or the root-mean-square (RMS) value of DGD (the DGD of a given device is a random variable that varies over both wavelength and time).

As explained in commonly-owned U.S. Pat. No. 6,724,469 (Leblanc), in optical communication systems, an unacceptable overall polarization mode dispersion (PMD) level for a particular long optical fiber may be caused by one or more short sections of the overall optical fiber link. Where, for example, a network service provider wishes to increase the bitrate carried by an installed optical fiber link, say up to 40 Gb/s, it is important to be able to obtain a distributed measurement of PMD, i.e., obtain the PMD information against distance along the fiber, and locate the singularly bad fiber section(s) so that they can be replaced—rather than replace the whole cable.

It is known to use a so-called polarization optical time domain reflectometer (POTDR) to try to locate such sections. Whereas conventional optical time domain reflectometers (OTDRs) measure only the intensity of backscattered light to determine variation of attenuation along the length of a transmission path, e.g., an installed optical fiber, POTDRs utilize the fact that the backscattered light also exhibits polarization dependency to monitor polarization dependent characteristics of the transmission path. Basically, a POTDR is an OTDR that is sensitive to the state of polarization (SOP) of the backscattered signal. Thus, the simplest POTDR comprises an OTDR having a polarizer between its output and the fiber-under-test (FUT) and an analyzer in the return path, between its photodetector and the FUT. (It should be appreciated that, although a typical optical transmission path will comprise mostly optical fiber, there will often be other components, such as couplers, connectors, etc., in the path. For convenience of description, however, such other components will be ignored, it being understood, however, that the term "FUT" used herein will embrace both an optical fiber and the overall transmission path according to context.)

Generally, such polarization optical time domain reflectometers can be grouped into two classes or types. Examples of the first type of POTDR are disclosed in the following documents:

F. Corsi, A. Galtarossa, L. Palmieri, "Beat Length Characterization Based on Backscattering Analysis in Randomly Perturbed Single-Mode Fibers," Journal of Lightwave Technology, Vol. 17, No. 7, July 1999.

A. Galtarossa, L. Palmieri, A. Pizzinat, M. Schiano, T. Tambosso, "Measurement of Local Beat Length and Differential Group Delay in Installed Single-Mode Fibers", "Journal of Lightwave Technology, Vol. 18, No. 10, October 2000. (N.B. only total PMD from end-to-end is measured for comparison, not cumulative PMD vs z.).

A. Galtarossa, L. Palmieri, M. Schiano, T. Tambosso, "Measurement of Beat Length and Perturbation Length in Long Single-Mode Fibers," Optics Letters, Vol. 25, No. 6, Mar. 15, 2000.

B. Huttner, "Distributed PMD measurement with a polarization-OTDR in optical fibers", Journal of Lightwave Technology, Vol. 17, pp. 1843-1948, March 1999.

U.S. Pat. No. 6,946,646 (Chen et al.)

US published patent application number 2004/0046955, Fayolle et al.

The first type of POTDR basically measures local birefringence (1/beat-length) as a function of distance z along the fiber, or, in other words, distributed birefringence. Referring to the simple and well-known example of a retardation waveplate, birefringence is the retardation (phase difference) per unit length between the "slow" and "fast" axes. In other words, the retardation is the birefringence times the thickness of the waveplate. This is not a PMD measurement, though that is a common misconception. First, in a simplified picture, DGD(z) is the derivative, as a function of optical frequency (wavelength), of the overall retardation of the fiber section extending from 0 to z. Second, a long fiber behaves as a concatenation of a large number of elementary "waveplates" for which the orientation of the fast and slow axes, as well as the retardation per unit length, vary randomly as a function of distance z.

Accordingly, DGD(z) is the result of a complicated integral over all that lies upstream that exhibits random birefringence and random orientation of the birefringence axis as a function of z, whereas birefringence is the retardation per unit length at some given location. Additionally, as mentioned above, the derivative, as a function of optical frequency, of such integral must be applied in order to obtain DGD as per its definition.

A general limitation of all the techniques of this first type, therefore, is that they do not provide a direct, reliable, valid in all cases and quantitative measurement of PMD with respect to distance along the optical fiber. Instead, they measure local birefringence (or beat-length) and/or one or more related parameters and infer the PMD from them based notably on assumptions about the fiber characteristics and specific models of the birefringence. For instance, they generally assume a relationship between PMD and local values of the birefringence and so-called coupling-length (or perturbation-length), which does not necessarily stand locally even when it stands in average.

As an example, such techniques assume that fibers exhibit exclusively "linear" birefringence. If circular birefringence is indeed present, it is "missed" or not seen, because of the properties of a round trip through the fiber (OTDR technique). Notably, twisted fibers like modern spun fibers already require some special models, which implies that an instrument must know in advance the type and characteristics of the FUT, which is unacceptable for a commercial instrument.

As a second example, the birefringence and other parameters must be measured accurately throughout the length, even in sections where the local characteristics of the fiber do not satisfy the assumed models and conditions; otherwise, the inferred PMD of such sections, which is an integral over some long length, can be largely misestimated, even qualitatively speaking. In practice, although they can measure birefringence quantitatively (cf. F. Corsa et al. supra), or statistically screen high birefringence sections (Chen et al. supra), or obtain qualitative and relative estimates of the PMD of short sections provided that one accept frequently occurring exceptions (Leblanc, Huttner, supra), POTDR techniques of this first type cannot reliably and quantitatively measure PMD, particularly of unknown, mixed installed fibers in the field. Furthermore, they are incapable of inferring, even approximately, the overall PMD of a long length of fiber, such as for example 10 kilometers.

Fayolle et al. (supra) claim to disclose a technique that is "genuinely quantitative, at least over a given range of polarization mode dispersion". However, this technique also suffers from the fundamental limitations associated with this type, as mentioned above. In fact, while their use of two SOPs (45° apart) with two trace variances might yield a modest improvement over the similar POTDRs of the first type (e.g., Chen at al.'s, whose VOS is essentially the same as Fayolle et al.'s trace variance), perhaps by a factor of $\sqrt{2}$, it will not lead to a truly quantitative measurement of the PMD with respect to distance along the FUT with an acceptable degree of accuracy. It measures a parameter that is well-known to be related or correlated with beat-length (birefringence), but not representative of the PMD coefficient. Indeed, even the simulation results disclosed in Fayolle et al.'s specification indicate an uncertainty margin of 200 percent.

It is desirable to be able to obtain direct, quantitative measurements of PMD, i.e., to measure the actual cumulative PMD at discrete positions along the optical fiber, as if the fiber were terminated at each of a series of positions along its length and a classical end-to-end PMD measurement made. This is desirable because the parameter that determines pulse-spreading is PMD, not birefringence. If one knows the actual PMD value of a communications link one can determine, accurately, the bit error rate or outage probability (probability that the communication will fail over a period of time), or the power penalty (how much more power must be launched to maintain the same bit error rate as if there were no PMD).

(In this specification, the term "cumulative PMD" is used to distinguish from the overall PMD that is traditionally measured from end to end. Because PMD is not a localized quantity, PMD(z) is an integral from 0 to z, bearing resemblance to a cumulative probability rather than the probability distribution.)

The second type of known POTDR is dedicated specifically to PMD measurement. This type does not suffer from the above-mentioned fundamental limitations of the first type of POTDR and so represents a significant improvement over them, at least in terms of PMD measurement. It uses the relationship between POTDR traces obtained at two or more closely-spaced wavelengths in order to measure PMD directly at a particular distance z, i.e. cumulative PMD, without any assumption about the birefringence characteristics of the fibers, nor any need for an explicit or implicit integral over length, no missed sections, no problem with spun fibers, and so on. Even a circularly birefringent fiber or a section of polarization-maintaining fiber (PMF) is measured correctly. In contrast to implementations of the first type, there is no need to invoke assumptions and complicated models in order to qualitatively infer PMD.

Thus, measurement of cumulative PMD as a function of distance z along the fiber, and its slope, as allowed by a POTDR of this second type, facilitates reliable identification and quantitative characterization of those singular, relatively-short sections where the slope of the PMD vs. distance is large over some distance, thus accounting for almost all the PMD of the link, the rest contributing a much smaller percentage of the total PMD.

Most known POTDR techniques of this second type rely upon there being a deterministic relationship between the OTDR traces obtained with a small number of specific input-SOP and output polarization axes, as disclosed, for example, in U.S. Pat. No. 6,229,599 (Galtarossa), an article by H. Sunnerud, B-E. Olsson, P. A. Andrekson, "Measurement of Polarization Mode Dispersion Accumulation along Installed Optical Fibers", I.E.E.E. Photonics Technology Letters, Vol. 11, No. 7, July 1999 and an article by H. Sunnerud, B-E. Olsson, M. Karlsson, P. A. Andrekson and J. Bretnel entitled "Polarization-Mode Dispersion Measurements Along Installed Optical Fibers Using Gated Backscattered Light and a Polarimeter", Journal of Lightwave Technology, Vol. 18, No. 7, July 2000. This requires the FUT to be spatially stable throughout the time period over which all the traces are measured. Unfortunately, such stability cannot be assured, especially where an installed fiber is being measured.

In addition, known techniques of the second type require the use of short pulses, "short" meaning shorter than the beat length and coupling length of any section of the FUT. In order for them to measure high PMD in fibers properly, without being limited to fibers of very large beat length (which often will have low PMD), they must use OTDR optical pulse widths of less than 5 to 10 ns at maximum. Unfortunately, practical OTDRs do not have a useful dynamic range with such short pulses. On the other hand, if a long light pulse is used, only fibers having long beat lengths can be measured, which limits these techniques, overall, to measurement of short distances and/or with long measurement times, or to fibers with large beat length (typically small PMD coefficient). Hence, although it might be possible, using known techniques and meeting the above-mentioned requirements, to make a reasonably successful measurement, at present their scope of application and performance would be insufficient for commercially-viable, stand-alone instrument.

In addition, the use of short pulses exacerbates signal-to-noise ratio (SNR) problems due to the so-called coherence noise that superimposes on OTDR traces and is large when short pulses are used. It is due to the fact that the power of the backscattered light is not exactly the sum of powers emanating from each element (dz) of the fiber. With a coherent source such as a narrowband laser, as used in POTDR applications, there is interference between the different backscattering sources. This interference or coherence noise that is superimposed on the ideal trace (sum of powers) is inversely proportional to both the pulse width (or duration) and the laser linewidth. It can be decreased by increasing the equivalent laser linewidth, i.e. the intrinsic laser linewidth as such, or, possibly, by using "dithering" or averaging traces over wavelength, but this reduces the maximum measurable PMD and hence may also limit the maximum length that can be measured, since PMD increases with increasing length. Roughly speaking, the condition is PMD*Linewidth<1; otherwise the useful POTDR signal is "washed out" by depolarization.

Accordingly, known POTDR techniques suffer from the limitation that they do not measure, quantitatively and accurately, cumulative PMD at specific distances along a FUT, especially a long optical fiber of the kind now being used in optical communications systems, with a satisfactory dynamic range (long pulses) and without stringent requirements regarding the stability of the FUT.

SUMMARY OF THE INVENTION

The present invention seeks to eliminate, or at least mitigate, the disadvantages of the prior art discussed above, or at least provide an alternative. To this end, in a method of measuring cumulative polarization mode dispersion (PMD) along the length of a fiber-under-test (FUT), a single-end polarization sensitive optical time domain reflectometer (POTDR) is used to inject into the FUT plural series of light pulses arranged in several groups. Each group comprises at least two series of light pulses having different but closely-spaced wavelengths and the same SOP. At least two, and preferably a large number of such groups, are injected and corresponding OTDR traces obtained for each series of light pulses by averaging the impulse-response signals of the several series of light pulses in the group. The process is repeated for a large number of groups having different wavelengths and/or SOPs. The PMD then is obtained by normalizing the OTDR traces of all of the groups, then computing the difference between each normalized OTDR trace in one group and the corresponding normalized OTDR trace in another group, followed by the mean-square value of the differences. Finally, the PMD is computed as a predetermined function of the mean-square difference. The function may, for example, be a differential formula, an arcsine formula, and so on.

According to a first aspect of the present invention, there is provided a method of measuring cumulative polarization mode dispersion (PMD) along the length of a fiber-under-test (FUT) using a single-end polarization sensitive optical time domain reflectometry means (POTDR), the method comprising the steps of:

(i) injecting into an end of the FUT a first group of at least two series of light pulses having at least two different wavelengths, respectively, each of said at least two different wavelengths being closely-spaced from the or each of the other wavelengths by a respective small wavelength difference corresponding to a respective small optical frequency difference, the lowermost and uppermost of said at least two wavelengths defining therebetween a first center wavelength ($\lambda_1$) for said first group, the at least two series of light pulses of the first group having the same state of polarization (SOP1);

(ii)(a) for each of at least some of the light pulses in each series of light pulses, detecting at least one polarization component of a resulting backreflected signal caused by Rayleigh scattering and/or discrete reflections along the FUT to provide a corresponding impulse-response, said at least one polarization component being the same for each of the said series, and converting each of the impulse-responses into a corresponding electrical impulse-response signal, (ii)(b) for each series of light pulses of said first group, sampling and averaging the electrical impulse-response signals of said each of at least some of the light pulses to provide a corresponding first group of OTDR traces each representing detected backscattered power versus time for the corresponding series of light pulses in said first group;

(iii) injecting into said FUT at least a second group of at least two series of light pulses having at least two different wavelengths, respectively, each of said at least two different wavelengths being separated by a small optical frequency difference equal to the corresponding said small optical frequency difference of the said first group, lowermost and uppermost of said at least two wavelengths defining therebetween a second center wavelength ($\lambda_2$) for said second group, the at least two series of light pulses of the second group having the same state of polarization (SOP2) as each other; and wherein either or both of said state of polarization (SOP2) and center wavelength ($\lambda_2$) of said second group differ from those of the first group of series of light pulses;

(iv)(a) for each of at least some of the light pulses in each of the at least two series of light pulses in said second group, detecting at least one polarization component of a resulting backreflected signal caused by Rayleigh scattering and/or discrete reflections along the FUT to provide a corresponding impulse-response, said at least one polarization component being the same for each of the said series of light pulses of said second group, and converting each of the impulse-responses into a corresponding electrical impulse-response signal, (iv)(b) for each series of light pulses of said second group, sampling and averaging the electrical impulse-response signals of said each of at least some of the light pulses to provide a corresponding second group of OTDR traces each representing detected backscattered power versus time for the corresponding series of light pulses in said second group; and (v) computing:
  (a) an average OTDR trace from the OTDR traces in the first group of OTDR traces and the second group of OTDR traces, and dividing each of the OTDR traces by the said average OTDR trace, point by point, to obtain a first group of normalized OTDR traces and a second group of normalized OTDR traces,
  (b) the difference, point-by-point temporally, between the normalized OTDR traces or each pair of normalized OTDR traces at different wavelengths in each of the first and second groups of normalized OTDR traces,
  (c) for at least one temporal point, the mean-square value of said differences to obtain a mean-square difference with respect to time, and (vi) computing the cumulative PMD value at at least one specific distance z along the FUT corresponding to the said at least one temporal point as a predetermined function of said mean-square difference, said predetermined function being dependent upon the respective difference or differences between the wavelengths corresponding to the normalized OTDR traces or each pair of normalized OTDR traces.

Step (v) may include the steps of computing the relative variance of each normalized trace, point by point, and averaging said relative variances to obtain the overall variance of all of the traces in the first and second groups, and computing the ratio of the mean-square difference over the relative variance; in which case step (vi) then computes the PMD as a function of said ratio. These additional steps should be carried out when the POTDR is operated with pulses much greater than about one-tenth of the minimum beat length in the FUT.

Preferably, OTDR traces are obtained in a similar manner for a large number of groups having different SOPs and/or center-wavelengths, preferably with both different SOPs and center-wavelengths. Advantageously, at least ten different SOPs and/or center wavelengths are used to provide meaningful results, e.g. for a fast estimate having limited accuracy. For high accuracy regardless of how small the PMD value may be and for reliable results with any type of FUT including PMF fibers or normal fibers with a low polarization coupling ratio, however, it is preferable to repeat steps (i) to (iv) as many as 100-200 times with both different SOPs and center-wavelengths. Indeed, given the definition of PMD as an average of DGD over a large wavelength range or over a period of time, in general the greater the number of measurements the better the accuracy and reliability.

According to a second aspect of the invention, there is provided polarization optical time domain reflectometry means comprising:

(i) optical means (10,20) for:
 (a) providing groups of series of light pulses and controlling wavelength and state of polarization of each of said series of light pulses so that
  (1) light pulses in a particular series have the same wavelength;
  (2) all series of light pulses in a particular group have the same state of polarization;
  (3) each group of series of light pulses has either or both of a different centre wavelength and a different state of polarization as compared with each other group;
 (b) injecting each of said groups of series of light pulses into an end of a fiber-under-test (FUT 16), and
 (c) extracting from the FUT, for each of at least some of the light pulses in each series of light pulses, at least one polarization component of a resulting backreflected signal caused by Rayleigh scattering and/or discrete reflections along the FUT to provide a corresponding impulse-response, said at least one polarization component being the same for each of the said series in a particular group;
(ii) detector means (26) for converting each of the impulse-responses into a corresponding electrical impulse-response signal,
(iii) sampling and averaging means (28) for sampling and averaging all of the electrical impulse-response signals of said each of at least some of the light pulses to provide an OTDR trace representing detected backscattered power versus time for each series of light pulses;
(iv) control and processing means (30,32) for controlling the optical means (10,20) and said sampling and averaging means (28) so as to:
 (A) cause said optical means (10,20) to inject into an end of the FUT a first group of at least two series of light pulses having at least two different wavelengths, respectively, each of said at least two different wavelengths being closely-spaced from the or each of the other wavelengths by a respective small wavelength difference corresponding to a respective small optical frequency difference, the lowermost wavelength ($\lambda_{1L}$) and uppermost wavelength ($\lambda_{1U}$), respectively, of said at least two wavelengths defining therebetween a first center wavelength ($\lambda_1$) for said first group, the at least two series of light pulses of the first group having the same state of polarization (SOP1);
 (B) cause the optical means (10,20) to extract, for each of at least some of the light pulses in each of said at least two series of light pulses in said first group, at least one polarization component of a resulting backreflected signal caused by Rayleigh scattering and/or discrete reflections along the FUT to provide a corresponding impulse-response, said at least one polarization component being the same for each of the said series of light pulses of said first group, and cause said detection means (26) to convert each of the impulse-responses into a corresponding electrical impulse-response signal,
 (C) for each series of light pulses in said first group, cause the sampling and averaging means (28) to sample the electrical impulse-response signals of said each of at least some of the light pulses to provide a corresponding first group of OTDR traces each representing detected backscattered power versus time for the corresponding series of light pulses of said first group;
 (D) cause said optical means (10,20) to inject into an end of the FUT a second group of at least two series of light pulses having at least two different wavelengths, respectively, each of said at least two different wavelengths of the second group being separated by a small optical frequency difference equal to the corresponding said small optical frequency difference of the said first group, lowermost and uppermost of said at least two wavelengths defining therebetween a second center wavelength ($\lambda_2$) for said second group, the at least two series of light pulses of the second group having the same state of polarization (SOP2) as each other, and wherein either or both of said state of polarization (SOP2) and a center wavelength ($\lambda_2$) of said second group differ from those of said first group of at least two series of light pulses,
 (E) cause the optical means (10,20) to extract, for each of at least some of the light pulses in each of the at least two series of light pulses in said second group, at least one polarization component of a resulting backreflected signal caused by Rayleigh scattering and/or discrete reflections along the FUT to provide a corresponding impulse-response, said at least one polarization component being the same for each of the said series of light pulses of said second group, and cause said detection means (26) to convert each of the impulse-responses into a corresponding electrical impulse-response signal,
 (F) for each series of light pulses of said second group, cause the sampling and averaging means (28) to sample and average the electrical impulse-response signals of said each of at least some of the light pulses to provide a corresponding second group of OTDR traces each representing detected backscattered power versus time for the corresponding series of light pulses of said second group;
the control and processing means (30,32) being operable to compute:
 (a) an average OTDR trace from the OTDR traces in the first group of OTDR traces and the second group of OTDR traces, and divide each of the OTDR traces by the said average OTDR trace, point-by-point, to obtain a first group of normalized OTDR traces and a second group of normalized OTDR traces,
 (b) in each of the first and second groups of normalized OTDR traces, the difference, point-by-point temporally, between the normalized OTDR traces or each pair of normalized OTDR traces, the OTDR traces in each pair corresponding to different wavelengths,
 (c) for at least one temporal point, the mean-square value of said differences to obtain a mean-square difference with respect to time, and
 (d) the cumulative PMD value at at least one specific distance z along the FUT corresponding to the said at least one temporal point as a predetermined function of said mean-square difference, said predetermined function being dependent upon the difference or differences between the wavelengths corresponding to said normalized OTDR traces in each pair thereof.

According to a third aspect of the invention, there is provided a method of measuring cumulative polarization mode dispersion (PMD) along the length of a fiber-under-test (FUT), using a single-end polarization sensitive optical time domain reflectometry means (POTDR), wherein the POTDR is used to inject into an end of the FUT plural series of light pulses arranged in several groups; each group comprising at least two series of light pulses having different but closely-spaced wavelengths defining a centre wavelength and having the same SOP; at least three of such groups being injected and a corresponding OTDR trace obtained for each of the series of light pulses in said at least three of such groups by averaging the impulse-response signals of the light pulses in that particular series, thereby obtaining a corresponding at least three groups of OTDR traces, wherein each group of series has a different centre wavelength and/or SOP as compared with other groups of series; the cumulative PMD, as a function of distance z along the FUT, being obtained by normalizing said at least three groups of OTDR traces to obtain at least three groups of normalized OTDR traces, computing the difference, point by point, between the normalized OTDR traces or each pair of normalized OTDR traces at different wavelengths in each group of normalized OTDR traces, followed by the mean-square value of the computed differences, at at least one temporal point, to obtain a mean-square difference as a function of time and, finally, computing the cumulative PMD at at least one specific distance z along the FUT corresponding to the said at least one temporal point as a predetermined function of said mean-square difference, said predetermined function being dependent upon the respective difference or differences between the wavelengths corresponding to said normalized OTDR traces in each said pair thereof.

In embodiments of either aspect of the invention, the first group of at least two series of light pulses may include at least one additional series of light pulses having a wavelength ($\lambda_{1I}$) intermediate said first upper wavelength ($\lambda_{1U}$) and said first lower wavelength ($\lambda_{1L}$) and having the same state of polarization (SOP1), said intermediate wavelength being unequally spaced from the lower and upper wavelengths, respectively, and the second group of at least two series of light pulses having either or both of a different state of polarization (SOP2) and a different center wavelength ($\lambda_2$) as compared with the first group of series of light pulses may also include at least one additional series of light pulses having a wavelength intermediate the respective wavelengths of the series of light pulses of the second group and unequally spaced therefrom.

In preferred embodiments of either aspect of the invention, the points that represents the selected SOPs on the surface of the Poincaré sphere may be substantially uniformly-distributed over the surface of the sphere, or may form a regular grid of points that uniformly covers the said surface.

The light pulses may each extend over a relatively long length (length=duration×the speed of light in the fiber). Advantageously, for FUT lengths and attenuation characteristics typical of most telecommunications applications, each of the light pulses has a duration that is equal to or longer than the minimum beat-length of the FUT.

The POTDR may comprise a tunable laser source for emitting light pulses and a polarization controller for selecting both the state of polarization of the light pulses entering the FUT and the state of polarization for analysis of the corresponding backscattered light received from the FUT; i.e., an I/O-SOP controller.

Preferably, the I/O-SOP controller comprises a polarizer means through which the light pulses pass in one direction and the backreflected signal caused by Rayleigh scattering and/or discrete reflections along the FUT passes in the opposite direction.

The control means may change the SOP and wavelength of each series of light pulses together.

The POTDR may use a tunable OTDR which can be tuned over a wide range of wavelengths, typically several hundred nanometers; but preferably within the range used in optical telecommunications systems.

The foregoing and other objects, features, aspects and advantages of the present invention will become more apparent from the following detailed description, in conjunction with the accompanying drawing, of a preferred embodiment of the invention which is described by way of example only.

DESCRIPTION OF THE PREFERRED EMBODIMENT

Figure 1:
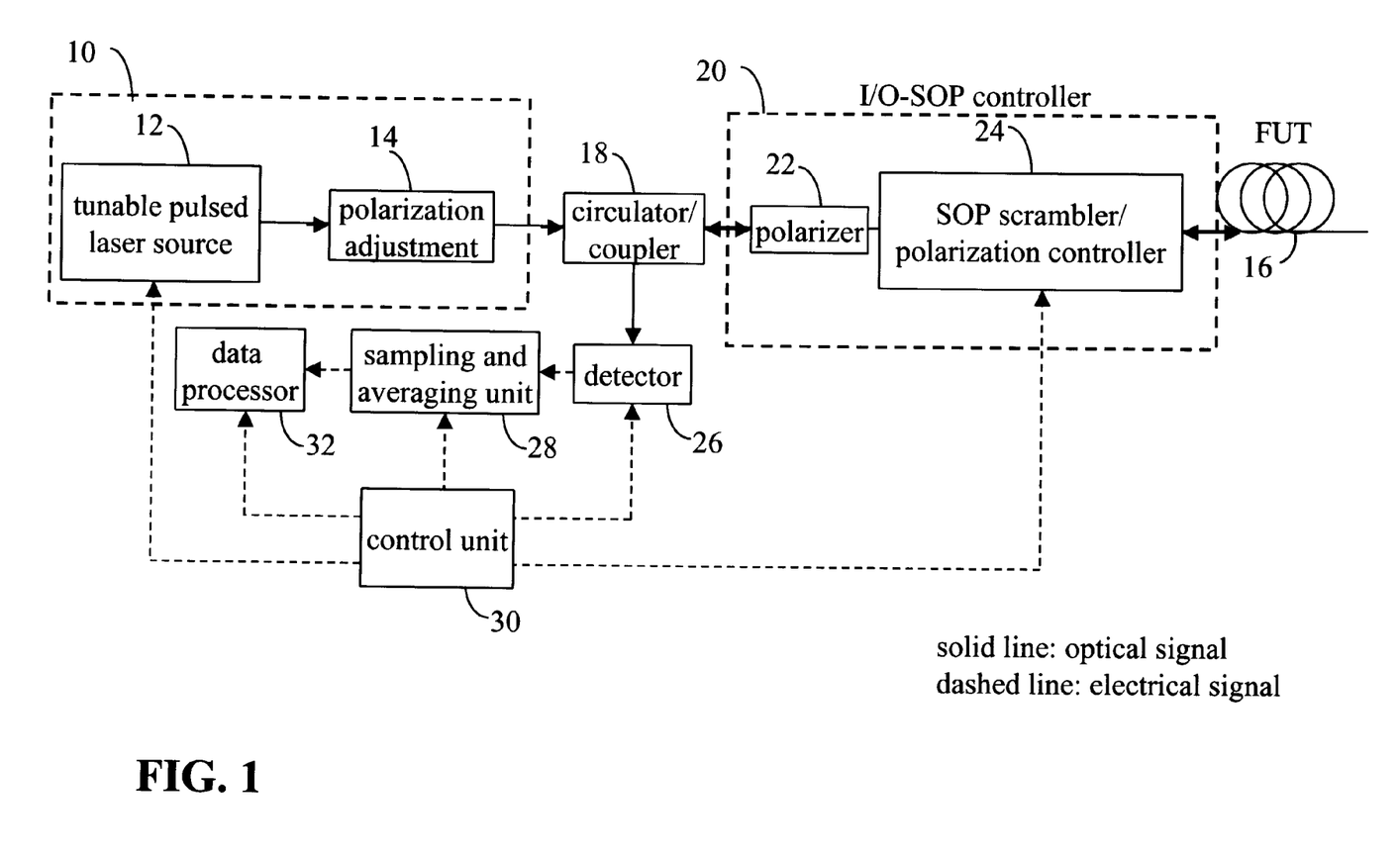
FIG. 1 is a simplified schematic diagram of a quantitative polarization optical time domain reflectometer embodying the present invention.

The quantitative polarization time domain reflectometry (POTDR) means illustrated in FIG. 1 comprises tunable light source means 10 in the form of a tunable laser source 12 and polarization state adjuster 14 for launching light pulses into a fiber-under-test (FUT) 16 via a circulator 18 and polarization control means 20 which comprises a polarizer 22 and a polarization controller 24. It should be noted that the polarization state adjuster is normally "factory set" to maximize the transmission of the light pulses through the polarizer 22 and should not normally need to be subsequently re-adjusted. For convenience, the polarization control means 20 will be referred to as an input/output SOP controller (I/O-SOP). Resulting backreflected light caused by Rayleigh scattering and/or discrete reflections from the (FUT) 16 passes through the I/O-SOP controller 20 in the reverse direction and is conveyed by the circulator 18 to a photodetector 26. The corresponding electrical signal is sampled as a function of time, and averaged, by sampling circuitry 28 under the control of a control unit 30 which also controls the tunable laser source 12. The resulting sampled and averaged data is processed by a data processor 32 to derive the cumulative PMD curve PMD(z), i.e., the polarization mode dispersion (PMD) as a function of the distance z along the FUT 16 from its end that is coupled to the I/O-SOP controller 20.

In addition to controlling the sampling and averaging circuit 28, the control unit 30 controls the wavelength of the tunable laser source 12 and the I/O-SOP selected by I/O-SOP controller 20. More specifically, for each setting k of the I/O-SOP controller 20, the control unit 30 causes the power to be measured at lower and upper wavelengths $\lambda_L^{(k)}$ and $\lambda_U^{(k)}$, respectively, closely spaced about the center wavelength $\lambda_1^{(k)}=(\lambda_L^{(k)}+\lambda_U^{(k)})/2$. (The labels L and U refer, for convenience and ease of understanding, to Lower and Upper with respect to the center wavelength ($\lambda_1^{(k)}$). The I/O-SOP controller 20 sets the different SOPs of the trains of pulses in a pseudo-random manner, such that the points representing the SOPs on the Poincaré sphere are uniformly-distributed over the surface of the sphere, whether the distribution is random or a uniform grid of points.

Before the operation of the polarization time domain reflectometry (POTDR) means is described, and with a view to facilitating an understanding of such operation, the theoretical basis will be explained, it being noted that such theory is not to be limiting.

Fundamentals

The computation applies the combined equations of the Generalized Interferometric Method (GINTY) and Poincaré Sphere Analysis (PSA), with appropriate adaptations resulting in the equations given below.

It should be recalled that PMD is the statistical RMS value of differential group delay DGD($\lambda$), estimated by averaging over a large wavelength range, or over a period of time, ideally both, so that the largest possible number of random occurrences of DGD are observed to obtain its RMS value.

Single-End Roundtrip-DGD Measurement Using a Mirror

If a mirror were at distance z along the FUT, and if one could neglect Rayleigh backscattering and any spurious discrete reflections, the OTDR could be replaced by a CW laser (no pulses) and a power meter for measuring the power reflected from the mirror at two closely spaced optical frequencies, $v_U$ and $v_L$, around a given center frequency, $v$, for a large number K of I/O-SOPs, i.e., one such setting refers to both the input-SOP and the analyzer axis "seen" by the backscattered light. (N.B. $\lambda=c/v$, where $\lambda$ is the vacuum wavelength of the light. Although the use of optical frequency is more "natural" in this theory, in practise, for closely-spaced wavelengths, wavelengths can be used, it being understood that the appropriate conversion factors are applied to the equations presented herein.) It has been found that, on average over a sufficiently large, uniformly distributed number of SOPs, the mean-square difference between relative powers observed at $v_U$ and $v_L$ is related to the roundtrip-DGD by a simple relationship, valid in all cases for any type of practical FUT regardless of its degree of randomness or its polarization coupling ratio, including the extreme case of a PMF fiber, i.e., $$DGD_{RoundTrip}(v) = \frac{1}{\pi \delta v}\arcsin\left(\sqrt{\frac{5}{3}\langle\Delta P_r(v)^2\rangle_{SOP}}\right) \quad (1)$$

where $\langle\ \rangle_{SOP}$ is the average over SOP, $\delta v=(v_U-v_L)$ is the "step", and $\Delta P_r$ is the difference between the relative powers ($P_r=P/\langle P\rangle_{SOP}$) observed at $v_U$ and $v_L$, respectively. The relationship holds for DGD·$\delta v<\frac{1}{2}$, thus clarifying the meaning of "closely-spaced wavelengths".

The roundtrip DGD derived by equation (1) is not double the forward DGD. Fortunately, on average over wavelength, time, or some interval $\Delta z$, the PMD value (statistical average) is related to the roundtrip-PMD through a simple factor, i.e. PMD=sqrt($\frac{3}{8}$)·PMD$_{RoundTrip}$, where PMD is defined as the root-mean-square (RMS) value of DGD (NB: a different roundtrip factor results if using the alternative definition of PMD, i.e. the mean value of DGD, instead of the RMS-DGD definition).

With OTDR: The Short Pulse Case

OTDR "traces", or backscattered power as a function of distance z, are the same as if the above measurement were repeated an infinite number of times, with the mirror shifted by a distance increment dz between measurements. Providing that the pulses are very short, and also ignoring the fact that the "coherence noise" always adds to the OTDR trace, the same result as in equation (1) is obtained, except that it is obtained as a function of distance z in one step. The different $\Delta P_r(v,z)$ values obtained with different I/O-SOPs are now differences between whole ODTR traces vs. z, instead of just one number; and give $DGD_{RoundTrip}(v,z)$.

The Long Pulse Case

It is generally impractical to use very short pulses in the field, however, because attainment of a useful dynamic range requires an exceedingly long measurement time. Also, a reduction of the high coherence noise levels requires an unacceptably large equivalent laser linewidth (which results in a small maximum measurable PMD). The present invention takes account of the finding that with large pulses, the mean-square differences $\langle\Delta P_r(v,z)^2\rangle_{SOP}$ are simply "scaled down" by a factor that can be computed independently from the same raw data. This factor is the relative variance of the traces, a function of z depending on local characteristics of the fiber, defined as, $$\sigma_r^2(z,v) = \frac{1}{5}[\langle P_r(z,v)^2\rangle_{SOP} - \langle P_r(z,v)\rangle^2_{SOP}] \quad (2)$$

The basic equation of the POTDR is obtained by dividing the mean-square differences in equation (1) by the relative variance in equation (2), and multiplying by the roundtrip factor, i.e., $$DGD(z,v) = \sqrt{\frac{3}{8}}\frac{1}{\pi\delta v}\arcsin\left(\sqrt{\frac{5}{3}\frac{\langle\Delta P_r(z,v)^2\rangle_{SOP}}{\sigma_r^2(z,v)}}\right) \quad (3)$$

It is envisaged that, in the above equations (2) and (3), the averages over SOP could be replaced by averages over a large range of optical frequencies (i.e., wavelengths) where the SOP is kept constant. However, in this "constant-SOP" case, the method loses its applicability to all FUT types, i.e., if only the center-wavelength is scanned without SOP-scrambling being applied, these relationships are no longer universally valid, and may be significantly less reliable and/or accurate—even if still roughly valid. Generally, if no I/O-SOP "scrambling" is performed, the method is only valid if the FUT is "ideal" or "nearly ideal", i.e., it exhibits excellent random coupling and has an infinite or "near-infinite" polarization coupling ratio, and if one chooses a large value of the PMD*$\Delta v$ product (typically >10), where $\Delta v$ is the width of the optical frequency range. As a consequence, small PMD values cannot be measured with any reasonable uncertainty in practice. In addition, one frequently wishes to perform measurement on older installed fibers, which are generally much less "ideal" then fibers produced since about 2001.)

The method of operation of the POTDR is as follows.

Initially, the following measurement parameters are set:

The number (K) of center-wavelengths and/or states of polarization selected by the I/O-SOP controller 20.

The step or difference $\delta v$ (or $\delta\lambda$) between the two closely spaced optical frequencies $v_U$ and $v_L$;

The wavelength range [$\lambda$min . . . $\lambda$max] that will be scanned by the tunable laser 12. (NB: this range scanned by the laser refers to the different values of the center-wavelength);

The pulse length (or duration, as Tp=100, 200, 300 ns);

The pulse repetition period (according to the round-trip time through the length of the fiber); and The averaging time $\Delta t$ of each individual trace (as, for example, $\Delta t$=1 or 2 seconds).

With the SOP controller 24 set to a first SOP, a first group of four OTDR traces are measured. Thus, the tunable laser 12 transmits a periodic train of light pulses of, say, the lower wavelength $\lambda_{1L}$ into the FUT 16, with the preset repetition period (time between two consecutive pulses). The corresponding backscattered light signal received by the photodetector 26 is converted to an electrical signal which is sampled by an A-to-D converter (not shown) in the sampling and averaging unit 28 to obtain the power of the backscattered light as a function of time, the sampling being controlled by the control unit 30.

The resulting power signal also is a periodic signal, with the same period as the train of pulses. It will be appreciated, however, that the power signal is not itself a series of pulses. In fact, the A-to-D converter samples one period, then the next, over the preset averaging time $\Delta t$. While the backscatter signal itself repeats from one period to the other, the noise does not, so the averaging of these signals, each sampled over one period, cancels the noise. The result of this averaging is one trace of power vs. time of the backscattered light at the particular wavelength and SOP.

The repetition period is set according to the length of the FUT 16 to be measured and, as a general rule, will be a little longer than the roundtrip time through the FUT 16. For a FUT 16 that is 50 km long, for example, the roundtrip time is on the order of 0.5 ms, so the repetition period is set to 0.5 ms or slightly larger. Therefore, for each trace, a series of about 2000 pulses are launched into the FUT 16 over an averaging time of about 1 sec, or, in other words, 2000 "one-pulse traces" are averaged. (These "one-pulse traces" can also be termed the "impulse response of the FUT".) For a shorter FUT 16, more pulses can be sent for a given averaging time, since the roundtrip time is smaller and thus the repetition period can be set smaller.

While keeping the same SOP, the procedure is repeated for a second series of pulses at the upper wavelength $\lambda_{1U}$.

Although it would be possible to measure only one pair of traces, i.e., one trace at each of the two wavelengths $\lambda_{1L}$ and $\lambda_{1U}$ for each SOP (and/or center wavelength, where applicable), it is preferable to repeat the measurement procedure using two duplicate series of light pulses (i.e., with the same SOP and wavelengths $\lambda_{1L}$ and $\lambda_{1U}$). As will be explained more fully later, acquiring four traces instead of two traces allows elimination of the noise offset which otherwise would appear when computing a mean-square value such as in equation (3). It also allows the contribution of the noise to the relative variance (see equation (2)) to be evaluated, and subtracted. This is an important aspect for increasing dynamic range because, otherwise, the measurement would be more sensitive to, as well as biased by, the noise that is superimposed on the traces ("biased" meaning that the measured value does not converge toward the correct value even if averaged over a large number of measurements in order to average out the noise)

The wavelength difference or frequency separation between the two wavelengths ($\delta\lambda=(\lambda_U-\lambda_L)$ or $\delta\lambda=(\nu_U-\nu_L)$) is adjustable, in dependence upon the maximum PMD to be tested or measured (PMD·$\delta\nu \leq 0.15$) For an FUT 16 of unknown PMD, $\delta\lambda$ can first be set to about 1 nm in the telecommunications "C band", a spectral region frequently of interest for PMD measurements. Then, $\delta\lambda$ (or $\delta\nu$) will be adjusted to a more appropriate value according to the maximum PMD of the FUT 16. Typically, the difference $\delta\lambda$ will be adjustable from about 0.025 nm to about 10 nm, so that a very wide range of PMD values can be measured with approximately equal percentage accuracy; for example, measurable maximum PMD from less than 0.1 ps up to 50 ps.

Each OTDR trace obtained with one given setting of the I/O-SOP 20 and center wavelength constitutes an elementary data cell. Each such trace is averaged over a series of "impulse response" measurements during the averaging time $\Delta t$, as set initially. One trace consists of N power values corresponding to N values $z_n$ of the distance z, with n=0 . . . (N−1).

The next larger data unit is one group of four traces, all obtained with a given SOP set by I/O-SOP controller 20. The four traces forming group k are obtained in the following sequence:

$SOP_k$ and/or $\lambda_k$:

$$\begin{array}{|c|c|c|c|} \hline \multicolumn{2}{c}{\lambda=\lambda_L^{(k)}} & \multicolumn{2}{c}{\lambda=\lambda_U^{(k)}} \\ \hline P_L^{(k)} & P''_L{}^{(k)} & P_U^{(k)} & P''_U{}^{(k)} \\ \hline \end{array}$$

where $\lambda_U^{(k)}-\lambda_L^{(k)}$ is equal to the step $\delta\lambda$, and the center wavelength is $\lambda_k=(\lambda_U^{(k)}+\lambda_L^{(k)})/2$ and the double prime indicates the duplicate trace.

Once the first group of four traces have been obtained with the SOP scrambler 24 set to a first SOP, the control unit 30 changes the center wavelength of the tunable laser 12 and/or sets the SOP scrambler 24 to a different SOP, and a second group of four traces are obtained and stored.

Further groups of traces are obtained for each of a large number (K) of different SOPs and/or center-wavelength $\lambda_k$. The K different values of $\lambda_k$ are chosen so as to be distributed uniformly over the wavelength range of interest [$\lambda$min . . . $\lambda$max]. However, this is neither critical nor an essential aspect of the present invention. The goal is to cover a large wavelength range in order to obtain the best possible average of DGD, as per the definition of PMD. The POTDR would work with a constant center wavelength as already mentioned, but covering a wavelength range gives superior accuracy, especially for small PMD values.

At each SOP and/or center wavelength, the difference $\delta\lambda$ between the two closely-spaced wavelengths $\lambda_U$ and $\lambda_L$ remains the same.

Each SOP and/or wavelength need only be selected for a very short time period (for example, 4*$\Delta t$ where $\Delta t$ is a time period for acquiring one P-OTDR trace at one wavelength ($\lambda_L$ or $\lambda_U$) that typically could be less than one second up to several seconds).

The sequence of measuring four traces for a particular setting of the SOP and center-wavelength is repeated for the K values of $SOP_k$ and $\lambda_k$, where k=0 . . . (K−1), until all of the K groups of traces are stored. The resulting data, depicted below as a matrix, comprises K groups each of four ODTR traces, each trace consisting of N points corresponding to N values of distance $z_n$, where n=0 . . . (N−1):

(4)

| | $\lambda = \lambda_L^{(k)}$ | | $\lambda = \lambda_U^{(k)}$ | |
|---|---|---|---|---|
| $SOP_0$ and/or $\lambda_0$ → | $P_L^{(0)}$ | $P''_L{}^{(0)}$ | $P_U^{(0)}$ | $P''_U{}^{(0)}$ |
| $SOP_1$ and/or $\lambda_1$ → | $P_L^{(1)}$ | $P''_L{}^{(1)}$ | $P_U^{(1)}$ | $P''_U{}^{(1)}$ |
| Data = : | : | : | : | : |
| $SOP_k$ and/or $\lambda_k$ → | $P_L^{(k)}$ | $P''_L{}^{(k)}$ | $P_U^{(k)}$ | $P''_U{}^{(k)}$ |
| : | : | : | : | : |
| $SOP_{K-1}$ and/or $\lambda_{K-1}$ → | $P_L^{(K-1)}$ | $P''_L{}^{(K-1)}$ | $P_U^{(K-1)}$ | $P''_U{}^{(K-1)}$ |

Data Processing

Once the groups of OTDR traces have been captured and stored, they are processed to obtain the cumulative PMD. It should be noted that the computation of $PMD_n$ at each point $z_n$ along the FUT 16 is performed independently of any other point n. Each is deduced from averages over SOP and/or wavelength only, as if N measurements of PMD were performed with a mirror inserted at point $z_n$. Thus, in the computation described below, it is inappropriate to use the index n; it must simply be understood that the calculation is repeated in the same way for each point n, or, in other words, effectively at each distance $z_n$.

Relative Traces

The traces P are averaged over SOP and/or wavelength in order to compute the relative traces Pr. Referring to the matrix named "Data" in equation (4), each of the four columns is treated separately:

$$Pr_L^{(k)} = \frac{P_L^{(k)}}{\langle P_L \rangle_{SOP;\lambda}} \quad (5)$$

$$Pr_L''^{(k)} = \frac{P_L''^{(k)}}{\langle P_L'' \rangle_{SOP;\lambda}}$$

$$Pr_U^{(k)} = \frac{P_U^{(k)}}{\langle P_U \rangle_{SOP;\lambda}}$$

$$Pr_U''^{(k)} = \frac{P_U''^{(k)}}{\langle P_U'' \rangle_{SOP;\lambda}}$$

By definition, $$\langle P_L \rangle_{SOP;\lambda} = \frac{1}{K} \sum_k P_L^{(k)}$$

and the same definition applies to the other three columns. It should be noted that, in the equations above, $\langle \ \rangle_{SOP;\lambda}$ can refer to averaging over either the SOP or the wavelength, ideally over both, i.e., changing both SOP and wavelength from one group of traces to the next. All of these relationships are fundamentally valid in all cases even if only SOP scrambling is applied, giving the correct value of the DGD at one particular center wavelength. Then, scanning the center wavelength only serves the purpose of averaging the correctly measured DGD over wavelength as per the definition of the statistical PMD value. On the contrary, as discussed earlier, averaging only over wavelength while keeping the SOP unchanged requires that assumptions about the FUT are indeed met, and also requires a large value of the product $PMD \cdot \Delta v$. The same remarks apply for the equations below.

Relative Variance

The relative variance, as in equation (2), is computed here as the average of the four available estimates, i.e., $$\sigma_r'^2 = \frac{1}{5}\left[\frac{\mathrm{var}(Pr_L) + \mathrm{var}(Pr_L'') + \mathrm{var}(Pr_U) + \mathrm{var}(Pr_U'')}{4}\right] \quad (6)$$

where the function "var" is defined as, $$\mathrm{var}(Pr_L) = [\langle Pr_L^2 \rangle_{SOP;\lambda} - \langle Pr_L \rangle_{SOP;\lambda}^2]$$

The same definition applies to the other three columns.

Mean-Square Differences

The calculation here differs from the simple mean-square described in section 4 which, for greater clarity, did not take account of noise. The mean-square difference is computed as, $$\langle \Delta P^2 \rangle = \langle (Pr_U - Pr_L)(Pr_U'' - Pr_L'') \rangle_{SOP;\lambda} \quad (7)$$

In this way, noise averages to zero instead of introducing a bias, because the noise over one trace is uncorrelated with the noise over another trace. That is the first motivation for sampling four traces per group instead of only two.

Noise Variance

The second motivation for sampling two traces, which are substantially identical in the absence of noise, for each setting of center wavelength λ and SOP, is the ability to obtain an accurate estimate of the noise variance. That is because the relative variance, as computed in equation (6), includes both the variance of the hypothetical noiseless trace and the variance of the noise. But if the noise variance is known, it can be subtracted since the variance of the sum of two independent random variables is equal to the sum of the variances.

The estimate of the noise variance is obtained as follows:

$$\sigma_{noise}^2 = \langle (Pr_L - Pr_L'')(Pr_U - Pr_U'') \rangle_{SOP;\lambda} \quad (8)$$

So in fact, the noise variance (eq. 8) is subtracted from the relative variance (eq. 6) in the computation of the relative variance, i.e., $$\sigma_r^2 = \sigma_r'^2 - \sigma_{noise}^2 \quad (9)$$

Computation of PMD

The PMD then is computed according to the arcsine formula as, $$PMD = \sqrt{\frac{3}{8}} \frac{1}{\pi \delta v} \arcsin\left(\sqrt{\frac{5}{8} \frac{\langle \Delta P^2 \rangle_{SOP;\lambda}}{\sigma_r^2}}\right) \quad (10)$$

It should be appreciated that the arcsine formula, equation (10), is not the only possible one. The purpose of using this formula is to obtain a result that is unbiased even if using a relatively large step, as $PMD \cdot \delta v \sim 0.15$, without inducing a significant error; this in order to maximize the signal to noise ratio and therefore the dynamic range of the instrument. If reaching the largest possible dynamic range, or keeping the overall measurement time reasonable, were not a concern or a customer request, one might select a much smaller step, and use the simpler differential formula that follows, $$PMD = \sqrt{\frac{5}{8}} \frac{1}{\pi \delta v} \cdot \sqrt{\frac{\langle \Delta P^2 \rangle_{SOP;\lambda}}{\sigma_r^2}} \quad (11)$$

This is not to infer that this formula is better or particularly advantageous, but merely that it may conveniently be used if the step is much smaller, i.e. $PMD \cdot \delta v < 0.01$. The PMD curve as a function of z is obtained by repeating the computation above, from equation (5) to equation (10), at each point n corresponding to distance $z_n$.

As mentioned above, it is desirable to use many center wavelengths λ as well as many I/O-SOPs. Consequently, it is desirable for the tunable OTDR to be tunable over a large range of wavelengths. Suitable tunable OTDRs, that are tunable over a range of several hundred nanometers, are known to those skilled in this art and so are not described in detail herein. An example of such a tunable OTDR can be found in Rossaro et al. (J. Select. Topics Quantum Mechanics, Vol 7, pp 475-483 (2001)), where an acousto-optic modulator is used to pulse the light from a continuous-wave tunable laser.

Alternatively, and referring again to FIG. 1, the tunable pulsed laser source 12 may comprise a continuous wave (CW) tunable laser and a semiconductor optical amplifier (SOA). The SOA acts as (i) an external modulator to produce light pulses, and (ii) an optical amplifier (SOA can amplify the input light from 3-6 dBm (input) to 17-20 dBm (output)). It is envisaged, however, that a SOA-based tunable fiber laser might be used instead, in which case the SOA current will be pulsed and no external modulator will be required.

The tunable pulsed laser source 12 may advantageously have, for example, a spectral linewidth of 3 to 15 GHz.

Such tunable pulsed laser source advantageously will provide a high output power but at a low cost.

The polarization state adjuster 14 may be used for single-mode optical-fiber (e.g. a fiber marketed as SMF-28 by Corning, Inc.)-based components (such as circulator/coupler and polarizer), to maximize the light output power from the polarizer 22 included in the I/O-SOP controller 20. However, this polarization state adjuster 14 may be omitted and a PMF-based circulator/coupler used instead. In such a case, the polarizer must be a PMF for input (with respect to the pulsed laser source) and a single-mode fiber for output.

The circulator 18 could be replaced by a coupler (e.g., a 50/50 coupler), but the circulator is preferred because it gives about 3 dB more dynamic range as compared to a 50/50 coupler.

The polarizer 22, which conveys the light pulses from the circulator 18 to the I/O-SOP scrambler 24, provides a single SOP for any different wavelength of the light pulses en route to the FUT 16. For backscattered light returning from the FUT 16, this polarizer 22 acts as an analyzer to generate an OTDR trace with "intensity oscillations" versus fiber distance (z) (POTDR trace compared to a traditional OTDR trace).

The operation of the I/O-SOP controller 20 is such that, for a given SOP of the light received at its input (which can be any SOP on the Poincaré Sphere), the SOP of the light leaving its output will be any one of a number of substantially uniformly distributed SOPs on the Poincaré Sphere, whether the distribution is of random or deterministic nature. Typically, the number of output states of polarization is about 100-200, but it could be any practical number. It is noted that the distribution of the SOPs need not, and generally will not, be truly random; so "pseudo-random" might be a more appropriate term in the case where a random distribution is indeed used for convenience because it is easier and less expensive to implement than a uniform grid of SOPs.

The FUT 16 may be any kind of fiber when random scrambling is indeed applied. If only the center wavelength $\lambda$ is scanned while a single SOP is used, the fundamental validity of the result cannot be assured in all cases; theoretical limitations exist if only one SOP is used, regardless of the quality of the physical instrument.

The detector 26 and sampling and averaging circuitry unit 28 may be as used in standard commercial OTDRs that are known to a person skilled in this art.

In addition to performing the processing steps described herein before, the data processor 32 may also reduce both the electronic noise and coherence noise.

The control unit 30 may advantageously be a separate computer. However, it is noted that a single computer could perform the functions of the processor 32 and control unit 30.

Various modifications to the above-described embodiment may be made within the scope of the present invention. For example, although a circulator 18 is preferred because it has low loss, it should be appreciated that other configurations are possible, such as a fiber coupler or a beamsplitter. Likewise, the tunable laser source 12 and I/O-SOP controller 20 could be replaced by some other means of providing the different polarization states of the pulses entering the FUT 16 and analyzing the resulting backreflected signal caused by Rayleigh scattering and/or discrete reflections leaving the FUT 16.

Thus, a polarimeter may be used (splitters with four analyzers and photodetectors in parallel), which measures more than one polarization component of the backreflected signal, or some other configuration, so that the power that reaches the photodetectors is dependent on the state of polarization (SOP) of the backscattered light.

It should be noted that each group is not limited to two series of light pulses. Indeed, it may be advantageous to use three or more different closely-spaced wavelengths per group of traces obtained with a common SOP, instead of the minimally-required two closely-spaced wavelengths $\lambda_L$ and $\lambda_U$ (each group then comprises 2*M OTDR traces instead of four, where M is the number of wavelengths in a group of series of light pulses). For example, in the case where three closely-spaced wavelengths are used, one can choose intervals or steps that differ between the lowermost and intermediate wavelength on one hand, and between the intermediate and uppermost wavelength on the other hand, such that one step is larger than the other, perhaps a few times larger. In this way, since there are three combinations of wavelength steps corresponding to three wavelengths (i.e., 3!/2), one can simultaneously obtain the data corresponding to two significantly different wavelength steps within a measurement time that is only 1.5 times greater than the time required to perform a one-step measurement. Thus, proceeding with three wavelengths (or more) per group proves highly advantageous because the PMD value can increase significantly along the length of the FUT 16 (from zero to the total PMD of the FUT), and hence the use of two, three, or more different steps allows one to maintain a satisfactory precision at all positions along the fiber.

The use of only one step gives one given absolute uncertainty, as for example ±0.1 ps, which represents a small % uncertainty at a distance where the PMD has grown to a value of 10 ps, but is not good in % at short distances where the PMD is, for example, only 0.2 ps. To get a smaller uncertainty for smaller PMD values, a larger step must be selected. Hence the obvious advantage of implementing such an alternate embodiment where more than two wavelengths per group are used. It changes nothing to the setup, nor to the principle of the invention as described above, but saves time in the overall measurement process.

Although the above-described embodiment changes the center wavelength for each SOP, this is not an essential feature of the present invention. While superior performance can be obtained by covering a large wavelength range in order to obtain the best possible average of DGD, as per the definition of PMD, a POTDR embodying the present invention will work with no bias and provide acceptable measurements of PMD(z), with a constant center-wavelength.

Advantages of embodiments of the present invention include the fact that:
    they relax the FUT 16 stability requirement via the pseudo-random-scrambling approach because no deterministic relationships have to be assumed between traces obtained with different SOPs and/or wavelengths. Moreover, this advantageous relaxing of the FUT 16 stability requirement is obtained whether it is actually performed via I/O-SOP scrambling (the preferred method), or, in the case of an "ideal" FUT (as defined previously), by relying only on the "natural" scrambling of the FUT's PSPs (principal states of polarization) which occur randomly and uniformly as a function of wavelength.

they use long pulses, in contrast to other POTDRs of the second type, leading to;
  (i) largely increased dynamic range,
  (ii) reduced coherence noise that superimposes on the traces,
  (iii) reduction of the required equivalent laser linewidth, therefore allowing a larger value for the maximum measurable PMD, they measure PMD directly, in contrast to POTDRs of the first type, so no assumed specific birefringence model is needed; in particular, they are especially suitable for measuring PMD of spun fibers; and.

they produce results that are genuinely quantitative.

Consequently, a tunable-wavelength POTDR embodying the present invention may advantageously provide excellent estimates of cumulative PMD along optical fibers. It may yield reliable PMD measurements even if the FUT 18 moves during the measurement. It can not only indicate the presence of high PMD fiber sections, but also provide quantitative cumulative PMD as a function of optical fiber distance. The dynamic range of the POTDR depends upon which technology will be used, as well as OTDR setting parameters such as pulse duration (or length) and acquisition time. It can range from 10 dB to over 20 dB for overall acquisition times ranging from less than 10 minutes to over 30 minutes. The OTDR optical pulse duration can be chosen among any reasonable values, such as 5 ns, 10 ns, 30 ns, 50 ns, 100 ns, 200 ns, 300 ns, 400 ns, 500 ns, and so on, depending upon how much dynamic range is needed or desired. The POTDR does not require the pulse length to be smaller than the beat length of the FUT 16. A long pulse can be used without significant degradation of the measurement results and, thereby, a larger dynamic range can be achieved. This result is a consequence of the random scrambling approach which leads notably to a simple equation (3) that is valid for any FUT 16 and any pulse length according to theory, and of the associated signal processing. Embodiments of the invention can measure PMD over a range extending from a few hundredths of picosecond to over 50 picosecond and may be used to locate high PMD fiber sections with excellent spatial resolution.

The technique provides high measurement accuracy and may also be used to compute beat length or birefringence as a secondary result, and thus the so-called coupling length or perturbation length of the FUT 16 as yet another result deduced from the knowledge of both PMD and birefringence. Moreover, by using Fresnel-backreflection from the distal end of the FUT 16, the overall PMD of an optical fiber link can also be measured, typically with a dynamic range of over 30 dB (round-trip loss=60 dB).

It is envisaged that, in certain circumstances, a tunable-wavelength POTDR with a large tuning range will not be essential, in which case a single center-wavelength POTDR (i.e. using two wavelengths $\lambda_U$ and $\lambda_L$ on either side of, and defining, the center-wavelength) may be used. This could be achieved by using two fixed-wavelength lasers 10, or by tuning one laser but over the relatively small difference between the two closely-spaced wavelengths.

If the center-wavelength is not scanned, the laser may be a simple and inexpensive DFB laser diode, which can be tuned enough over a few nm to give the two closely-spaced wavelengths.

Conversely, it is also envisaged that a tunable wavelength POTDR with a very large tuning range may be used with no I/O-SOP controller 20, despite the fundamental limitations of this approach explained hereinbefore.

INDUSTRIAL APPLICABILITY

In contrast to known techniques which use short pulses and/or rely upon the FUT 16 being stable over a relatively long period of time, typically several minutes to several tens of minutes, embodiments of the present invention do not require such long term stability. This is because OTDR traces corresponding to different SOPs and/or wavelengths (a few seconds averaging time), are treated as statistically independent (pseudo-randomly scrambled), without assuming any deterministic relationship between them.

Also, the use of relatively long pulses allows a much larger SNR than otherwise achievable for a given averaging time. This is because (i) the power of the backscattered light (signal) is proportional to the pulse length; and (ii) the detector bandwidth can be smaller, allowing both the bandwidth and spectral density of the noise to be reduced. Therefore, the effects of longer pulse-length on SNR are three-fold and multiplicative.

With long pulses, the Maximum Measurable PMD value can be larger for the following indirect reason: With short pulses, the "coherence noise" that superimposes over OTDR traces is larger. To reduce it when using short pulses, the "standard" solution is to increase the equivalent laser linewidth (the laser intrinsic linewidth as such, or alternatively, using dithering or other equivalent means). This limits the maximum measurable PMD. Therefore, as a consequence of these different advantages of using long pulses, the POTDR embodying the present invention can measure large values of cumulative PMD, that typically are seen at large values of z, within a reasonable measurement time.

In all OTDR applications, the power of the light backscattered by the FUT 16 decreased as a function of the distance from which the backscatter is issued, because any FUT 16 has a finite loss (typically 0.2-0.25 dB/km @ $\lambda$=1550 nm). The dynamic range of an OTDR can be defined as the maximum loss for which it is still possible to obtain a good measurement within some reasonable noise-induced uncertainty. Initial test results show a dynamic range of ~15 dB when using 100 ns pulses and 1 s averaging time of single traces, for a noise-induced uncertainty smaller than 10-15%. Tests with a prototype have shown that, with typical fiber loss (0.2-0.25 dB/km), a POTDR embodying this invention may reach up to 70 km with 200 ns pulses and 2 s averaging time.

The combination of the above advantages, i.e., significantly relaxed stability requirement, much larger SNR (and hence measurement range) due to the longer pulse lengths, and a realistic maximum measurable PMD (such as 20 to 30 ps), make a POTDR embodying the present invention particularly suitable for "field measurements" of long, installed fibers, possibly even those including an aerial section.

In the POTDR embodiment described hereinbefore, a single physical "polarization controller mean" is used for setting both the input-SOP and the output analyzer axis. Thus, the two are not independent of one another. It should be appreciated, however, that I/O-SOP controller 20 could comprise two different independent devices.

Scrambling

The term "pseudo-random-scrambling" as used herein is to emphasize that no deterministic relationship between one SOP and the next is needed or assumed by the computation. That is not to say, however, that the physical SOP controller

24 must be truly random as such. It may also follow, for example, that the SOPs define a uniform grid of points on the Poincaré-sphere, with equal angles between the Stokes vectors.

Uniformly-Distributed

A "pseudo-random" SOP means that each of the three components ($s1$, $s2$, $s3$) of the Stokes vector that represents that SOP on the Poincaré sphere is a random variable uniformly distributed between −1 and 1, and that any one of the three components is uncorrelated with the two others (average of the product =0). But whether the SOPs are on a grid or form a random set, the points on the sphere must be substantially uniformly-distributed.

However, if a grid is used instead of a random set, the calculation or processing must not assume a deterministic relationship between one SOP and the next. Otherwise, if the FUT 16 moves, as may occur in real telecommunications links, such deterministic relationships between traces obtained with a deterministic grid will be lost.

In the above-described embodiment the polarization component of each said backreflected signal is the same as the state of polarization of the corresponding series of light pulses, it is possible for them to be different. It will be appreciated that the computations would then need to be adapted, but such adaptation will not be described here because it should be obvious to a person or ordinary skill in this art.

The entire contents of the various patents, patent application and other documents referred to hereinbefore are incorporated herein by reference.

Although an embodiment of the invention has been described and illustrated in detail, it is to be clearly understood that the same is by way of illustration and example only and not to be taken by way of the limitation, the scope of the present invention being limited only by the appended claims.

The invention claimed is:

1. A method of measuring cumulative polarization mode dispersion (PMD) along the length of a fiber-under-test (FUT) using a single-end polarization sensitive optical time domain reflectometry means (POTDR), the method comprising the steps of:
   (i) injecting into an end of the FUT a first group of at least two series of light pulses having at least two different wavelengths, respectively, each of said at least two different wavelengths being closely-spaced from the or each of the other wavelengths by a respective small wavelength difference corresponding to a respective small optical frequency difference, the lowermost and uppermost of said at least two wavelengths defining therebetween a first center wavelength ($\lambda_1$) for said first group, the at least two series of light pulses of the first group having the same state of polarization (SOP1);
   (ii)(a) for each of at least some of the light pulses in each series of light pulses, detecting at least one polarization component of a resulting backreflected signal caused by Rayleigh scattering and/or discrete reflections along the FUT to provide a corresponding impulse-response, said at least one polarization component being the same for each of the said series, and converting each of the impulse-responses into a corresponding electrical impulse-response signal,
   (ii)(b) for each series of light pulses of said first group, sampling and averaging the electrical impulse-response signals of said each of at least some of the light pulses to provide a corresponding first group of OTDR traces each representing detected backscattered power versus time for the corresponding series of light pulses in said first group;
   (iii) injecting into said FUT at least a second group of at least two series of light pulses having at least two different wavelengths, respectively, each of said at least two different wavelengths being separated by a small optical frequency difference equal to the corresponding said small optical frequency difference of the said first group, lowermost and uppermost of said at least two wavelengths defining therebetween a second center wavelength ($\lambda_2$) for said second group, the at least two series of light pulses of the second group having the same state of polarization (SOP2) as each other; and wherein either or both of said state of polarization (SOP2) and center wavelength ($\lambda_2$) of said second group differ from those of the first group of series of light pulses;
   (iv)(a) for each of at least some of the light pulses in each of the at least two series of light pulses in said second group, detecting at least one polarization component of a resulting backreflected signal caused by Rayleigh scattering and/or discrete reflections along the FUT to provide a corresponding impulse-response, said at least one polarization component being the same for each of the said series of light pulses of said second group, and converting each of the impulse-responses into a corresponding electrical impulse-response signal,
   (iv)(b) for each series of light pulses of said second group, sampling and averaging the electrical impulse-response signals of said each of at least some of the light pulses to provide a corresponding second group of OTDR traces each representing detected backscattered power versus time for the corresponding series of light pulses in said second group; and
   (v) computing:
      (a) an average OTDR trace from the OTDR traces in the first group of OTDR traces and the second group of OTDR traces, and dividing each of the OTDR traces by the said average OTDR trace, point by point, to obtain a first group of normalized OTDR traces and a second group of normalized OTDR traces,
      (b) the difference, point-by-point temporally, between the normalized OTDR traces or each pair of normalized OTDR traces at different wavelengths in each of the first and second groups of normalized OTDR traces,
      (c) for at least one temporal point, the mean-square value of said differences to obtain a mean-square difference with respect to time, and
   (vi) computing the cumulative PMD value at at least one specific distance z along the FUT corresponding to the said at least one temporal point as a predetermined function of said mean-square difference, said predetermined function being dependent upon the respective difference or differences between the wavelengths corresponding to the normalized OTDR traces or each pair of normalized OTDR traces.

2. A method according to claim 1, wherein at least three of such groups are injected and corresponding OTDR traces obtained and processed.

3. A method according to claim 1, wherein the backreflected light comprises Fresnel-backreflection from a distal end of the FUT, and the measured cumulative PMD comprises the overall PMD of the FUT.

4. A method according to claim 1, wherein step (v) includes the steps of computing:
   (d) relative variance of the normalized OTDR traces, point by point temporally, and
   (e) the ratio of the mean-square difference over the relative variance, point-by-point;

and wherein step (vi) then computes the cumulative PMD as a function of said ratio.

5. A method according to claim 1, wherein said at least a second group in step (iii) comprises at least two groups each of at least two series of light pulses, each group of additional series of light pulses having either or both of a different state of polarization and a different center wavelength, and computing steps (v) and (vi) compute said cumulative PMD from at least one pair of normalized OTDR traces in the said first group and the corresponding at least one pair of normalized OTDR traces in each of said at least two groups.

6. A method according to claim 4, wherein each of the light pulses has a duration that is equal to or longer than the minimum beat-length of the FUT.

7. A method according to claim 5, wherein the step (i) of injecting said first group of at least two series of light pulses includes injecting at least one additional series of light pulses having a wavelength ($\lambda_{1I}$) intermediate said first uppermost wavelength ($\lambda_{1U}$) and said first lowermost wavelength ($\lambda_{1L}$) and having the same state of polarization (SOP1), said intermediate wavelength being unequally spaced from the lowermost and uppermost wavelengths, respectively, and said step of injecting into said FUT a second group of at least two series of light pulses having either or both of a different state of polarization (SOP2) and a different center wavelength ($\lambda_2$), as compared with the first group of at least two series of light pulses, includes injecting at least one additional series of light pulses having a wavelength intermediate the respective wavelengths of the series of light pulses of the second group and unequally spaced therefrom, wherein optical frequency differences between corresponding series of light pulses in said first group and second group, respectively, are equal, the impulse responses of the light pulses of each additional series being processed in a similar manner to the impulse responses of the pulses at the associated uppermost and lowermost wavelengths.

8. A method according to claim 5, wherein each group of two or more series of light pulses comprises a duplicate of each of said two or more series of light pulses, the computed OTDR traces including traces for the duplicate series of light pulses.

9. A method according to claim 5, wherein the number of different states of polarization and/or wavelengths is at least 10.

10. A method according to claim 5, wherein the number of different states of polarization and/or wavelengths is at least 200.

11. A method according to claim 5, wherein points representing the states of polarization of the series of light pulses on the Poincaré sphere are substantially uniformly-distributed over the surface of the sphere.

12. A method according to claim 5, wherein each of the light pulses has a duration that is less than 0.1 times the minimum beat-length of the FUT.

13. A method according to claim 5, wherein step (v) includes the steps of computing:
   (d) the relative variance of the normalized OTDR traces, point by point temporally, and
   (e) the ratio of the mean-square difference over the relative variance, point-by-point;
and wherein step (vi) then computes the cumulative PMD as a function of said ratio.

14. A method according to claim 5, wherein said predetermined function is selected for the case where the product (PMD·δv) of the cumulative PMD and the optical frequency difference (δv) corresponding to said wavelength difference is in the range from PMD·δv<0.01 to at least PMD·δv~0.15.

15. A method according to claim 14, wherein the cumulative PMD is computed according to the arcsine formula, $$PMD = \sqrt{\frac{3}{8}} \frac{1}{\pi \delta v} \arcsin\left(\sqrt{\frac{5}{3} \frac{\langle \Delta P^2 \rangle_{SOP;\lambda}}{\sigma_r^2}}\right).$$

16. Polarization optical time domain reflectometry means comprising:
   (i) optical means (10,20) for:
      (a) providing groups of series of light pulses and controlling wavelength and state of polarization of each of said series of light pulses so that
         (1) light pulses in a particular series have the same wavelength;
         (2) all series of light pulses in a particular group have the same state of polarization;
         (3) each group of series of light pulses has either or both of a different centre wavelength and a different state of polarization as compared with each other group;
      (b) injecting each of said groups of series of light pulses into an end of a fiber-under-test (FUT 16), and
      (c) extracting from the FUT, for each of at least some of the light pulses in each series of light pulses, at least one polarization component of a resulting backreflected signal caused by Rayleigh scattering and/or discrete reflections along the FUT to provide a corresponding impulse-response, said at least one polarization component being the same for each of the said series in a particular group;
   (ii) detector means (26) for converting each of the impulse-responses into a corresponding electrical impulse-response signal,
   (iii) sampling and averaging means (28) for sampling and averaging all of the electrical impulse-response signals of said each of at least some of the light pulses to provide an OTDR trace representing detected backscattered power versus time for each series of light pulses;
   (iv) control and processing means (30,32) for controlling the optical means (10,20) and said sampling and averaging means (28) so as to:
      (A) cause said optical means (10,20) to inject into an end of the FUT a first group of at least two series of light pulses having at least two different wavelengths, respectively, each of said at least two different wavelengths being closely-spaced from the or each of the other wavelengths by a respective small wavelength difference corresponding to a respective small optical frequency difference, the lowermost wavelength ($\lambda_{1L}$) and uppermost wavelength ($\lambda_{1U}$), respectively, of said at least two wavelengths defining therebetween a first center wavelength ($\lambda_1$) for said first group, the at least two series of light pulses of the first group having the same state of polarization (SOP1);
      (B) cause the optical means (10,20) to extract, for each of at least some of the light pulses in each of said at least two series of light pulses in said first group, at least one polarization component of a resulting back-reflected signal caused by Rayleigh scattering and/or discrete reflections along the FUT to provide a corresponding impulse-response, said at least one polarization component being the same for each of the said series of light pulses of said first group, and cause said detection means (26) to convert each of the impulse-responses into a corresponding electrical impulse-response signal, (C) for each series of light pulses in said first group, cause the sampling and averaging means (28) to sample the electrical impulse-response signals of said each of at least some of the light pulses to provide a corresponding first group of OTDR traces each representing detected backscattered power versus time for the corresponding series of light pulses of said first group;

(D) cause said optical means (10,20) to inject into an end of the FUT a second group of at least two series of light pulses having at least two different wavelengths, respectively, each of said at least two different wavelengths of the second group being separated by a small optical frequency difference equal to the corresponding said small optical frequency difference of the said first group, lowermost and upper most of said at least two wavelengths defining therebetween a second center wavelength ($\lambda_2$) for said second group, the at least two series of light pulses of the second group having the same state of polarization (SOP2) as each other, and wherein either or both of said state of polarization (SOP2) and a center wavelength ($\lambda_2$) of said second group differ from those of said first group of at least two series of light pulses, (E) cause the optical means (10,20) to extract, for each of at least some of the light pulses in each of the at least two series of light pulses in said second group, at least one polarization component of a resulting backreflected signal caused by Rayleigh scattering and/or discrete reflections along the FUT to provide a corresponding impulse-response, said at least one polarization component being the same for each of the said series of light pulses of said second group, and cause said detection means (26) to convert each of the impulse-responses into a corresponding electrical impulse-response signal, (F) for each series of light pulses of said second group, cause the sampling and averaging means (28) to sample and average the electrical impulse-response signals of said each of at least some of the light pulses to provide a corresponding second group of OTDR traces each representing detected backscattered power versus time for the corresponding series of light pulses of said second group;

the control and processing means (30,32) being operable to compute:

(a) an average OTDR trace from the OTDR traces in the first group of OTDR traces and the second group of OTDR traces, and divide each of the OTDR traces by the said average OTDR trace, point by point, to obtain a first group of normalized OTDR traces and a second group of normalized OTDR traces, (b) in each of the first and second groups of normalized OTDR traces, the difference, point-by-point temporally, between the normalized OTDR traces or each pair of normalized OTDR traces, the OTDR traces in each pair corresponding to different wavelengths, (c) for at least one temporal point, the mean-square value of said differences to obtain a mean-square difference with respect to time, and (d) the cumulative PMD value at at least one specific distance z along the FUT corresponding to the said at least one temporal point as a predetermined function of said mean-square difference, said predetermined function being dependent upon the difference or differences between the wavelengths corresponding to said normalized OTDR traces in each pair thereof.

17. Polarization optical time domain reflectometry means according to claim 16, wherein said optical means (10,20) comprises a polarizer (22) and a SOP controller (24) and each series of light pulses passes through said polarizer (22) and SOP controller (24) in the direction towards the FUT and the corresponding backreflected signal passes through the SOP controller (24) and the polarizer (22) in an opposite direction towards the detector means (26).

18. Polarization optical time domain reflectometry means according to claim 16, wherein said optical means (10,20) is caused to inject as part of each group of two or more series of light pulses a duplicate of each of said series of light pulses at a first lowermost wavelength and said series of light pulses at a first uppermost wavelength, the control and processing means then computing said OTDR traces including traces for the duplicate series of light pulses.

19. Polarization optical time domain reflectometry means according to claim 16, wherein said optical means (10,20) includes a polarizer (22) for selecting the state of polarization of the series of light pulses entering the FUT (16) and selecting said polarization component for detecting the corresponding backreflected signals leaving the FUT.

20. Polarization optical time domain reflectometry means according to claim 16, wherein each of the light pulses has a duration that is less than 0.1 times the minimum beat-length of the FUT.

21. Polarization optical time domain reflectometry means according to claim 16, wherein said at least a second group of series of light pulses comprises at least two groups each of at least two series of light pulses, each group of series of light pulses having either or both of a different state of polarization and a different center wavelength, and the control and processing means computes said cumulative PMD from at least one pair of normalized OTDR traces in the said first group and the corresponding at least one pair of normalized OTDR traces in each of the said at least two groups.

22. Polarization optical time domain reflectometry means according to claim 21, wherein the control and processing means is operable to cause said optical means (10,20), in addition to injecting said first group of at least two series of light pulses, to inject into said FUT at least one additional series of light pulses having a wavelength ($\lambda_{1I}$) intermediate said first uppermost wavelength ($\lambda_{1U}$) and said first lowermost wavelength ($\lambda_{1L}$) and having the same state of polarization (SOP1), said intermediate wavelength being unequally spaced from the lowermost and uppermost wavelengths, respectively, and when injecting into said FUT a second group of at least two series of light pulses having either or both of a different state of polarization (SOP2) and a different center wavelength ($\lambda_2$), as compared with the first group of at least two series of light pulses, to inject at least one additional series of light pulses having a wavelength intermediate the respective wavelengths of the series of light pulses of the second group and unequally spaced therefrom, the detecting and averaging means and the control and processing means being operable to detect and process the impulse responses of the pulses in the additional series along with the impulse responses of the pulses at the associated uppermost and lowermost wavelengths.

23. Polarization optical time domain reflectometry means according to claim 21, wherein points representing the states of polarization of the said at least two groups of at least two series of light pulses on the Poincaré sphere are substantially uniformly-distributed over the surface of the sphere.

24. Polarization optical time domain reflectometry means according to claim 21, wherein the detecting means detects Fresnel-backreflection from a distal end of the FUT and the control and processing means determines overall PMD of the FUT.

25. Polarization optical time domain reflectometry means according to claim 21, wherein said predetermined function used by said control and processing means (10,20) is selected for the case where the product (PMD·δv) of the cumulative PMD and the optical frequency difference (δv) corresponding to said wavelength difference is in the range from PMD·δv<0.01 to at least PMD·δv~0.15.

26. Polarization optical time domain reflectometry means according to claim 21, wherein the control and processing means is operable to compute relative variance of the normalized traces, point by point temporally, and the ratio of the mean-square difference over the relative variance, point-by-point, then compute said cumulative PMD as a function of said ratio.

27. Polarization optical time domain reflectometry means according to claim 25, wherein the cumulative PMD is computed according to the arcsine formula, $$PMD = \sqrt{\frac{3}{8}} \frac{1}{\pi \delta v} \arcsin\left(\sqrt{\frac{5}{3} \frac{\langle \Delta P^2 \rangle_{SOP;\lambda}}{\sigma_F^2}}\right).$$

28. Polarization optical time domain reflectometry means according to claim 26, wherein each of the light pulses has a duration that is equal to or longer than the minimum beat-length of the FUT.

29. A method of measuring cumulative polarization mode dispersion (PMD) along the length of a fiber-under-test (FUT), using a single-end polarization sensitive optical time domain reflectometry means (POTDR), wherein the POTDR is used to inject into an end of the FUT plural series of light pulses arranged in several groups; each group comprising at least two series of light pulses having different but closely-spaced wavelengths defining a centre wavelength and having the same SOP; at least three of such groups being injected and a corresponding OTDR trace obtained for each of the series of light pulses in said at least three of such groups by averaging the impulse-response signals of the light pulses in that particular series, thereby obtaining a corresponding at least three groups of OTDR traces, wherein each group of series has a different centre wavelength and/or SOP as compared with other groups of series; the cumulative PMD, as a function of distance z along the FUT, being obtained by normalizing said at least three groups of OTDR traces to obtain at least three groups of normalized OTDR traces, computing the difference, point by point, between the normalized OTDR traces or each pair of normalized OTDR traces at different wavelengths in each group of normalized OTDR traces, followed by the mean-square value of the computed differences, at at least one temporal point, to obtain a mean-square difference as a function of time and, finally, computing the cumulative PMD at at least one specific distance z along the FUT corresponding to the said at least one temporal point as a predetermined function of said mean-square difference, said predetermined function being dependent upon the respective difference or differences between the wavelengths corresponding to said normalized OTDR traces in each said pair thereof.

* * * * *

UNITED STATES PATENT AND TRADEMARK OFFICE
CERTIFICATE OF CORRECTION

PATENT NO. : 7,920,253 B2
APPLICATION NO. : 11/992797
DATED : April 5, 2011
INVENTOR(S) : Normand Cyr et al.

It is certified that error appears in the above-identified patent and that said Letters Patent is hereby corrected as shown below:

Column 23, line 50 (claim 11, line 3) the expression "Poincar ésphere" should read --Poincaré sphere--.
Column 26, line 66 (claim 23, line 4) the expression "Poincar é sphere" should read --Poincaré sphere--.

Signed and Sealed this
Twelfth Day of July, 2011

David J. Kappos
*Director of the United States Patent and Trademark Office*